(12) United States Patent
Youn et al.

(10) Patent No.: US 7,646,467 B2
(45) Date of Patent: *Jan. 12, 2010

(54) METHOD OF FABRICATING LIQUID CRYSTAL DISPLAY DEVICES HAVING VARIOUS DRIVING MODES ON A COMMON SUBSTRATE

(75) Inventors: Won-Gyun Youn, Gyeongsangbuk-Do (KR); Su-Woong Lee, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 42 days.

This patent is subject to a terminal disclaimer.

(21) Appl. No.: 10/832,288

(22) Filed: Apr. 27, 2004

(65) Prior Publication Data

US 2004/0263737 A1 Dec. 30, 2004

(30) Foreign Application Priority Data

Jun. 25, 2003 (KR) ............... 2003-41726
Apr. 16, 2004 (KR) ............... 2004-26369

(51) Int. Cl.
G02F 1/13 (2006.01)
G02F 1/1337 (2006.01)

(52) U.S. Cl. ............. 349/187; 349/56; 349/84; 349/129; 349/158

(58) Field of Classification Search .......... 349/73, 349/74, 83, 129, 187, 56, 84, 158
See application file for complete search history.

(56) References Cited

U.S. PATENT DOCUMENTS

| 4,832,457 | A | * | 5/1989 | Saitoh et al. | 349/73 |
| 5,164,853 | A | * | 11/1992 | Shimazaki | 349/73 |
| 5,796,458 | A | * | 8/1998 | Koike et al. | 349/126 |
| 6,195,149 | B1 | * | 2/2001 | Kodera et al. | 349/187 |
| 6,741,310 | B1 | * | 5/2004 | Nakanishi et al. | 349/141 |
| 6,870,594 | B1 | * | 3/2005 | Zhang | 349/187 |
| 7,092,063 | B2 | * | 8/2006 | Kim et al. | 349/153 |
| 7,362,410 | B2 | * | 4/2008 | Kim et al. | 349/189 |
| 2004/0100593 | A1 | * | 5/2004 | Kim et al. | 349/2 |
| 2005/0174523 | A1 | * | 8/2005 | Jung et al. | 349/153 |

* cited by examiner

Primary Examiner—Andrew Schechter
(74) Attorney, Agent, or Firm—McKenna Long & Aldridge

(57) ABSTRACT

A method of fabricating a liquid crystal display device, including: forming alignment layers over a first substrate and a second substrate, wherein the first and second substrates have a first region and a second region, the first and second regions each including a panel region, wherein a panel region in the first region has a different driving mode than a panel in the second region; producing a first alignment direction in the alignment layers of the first region; producing a second alignment direction in the alignment layers of the second region; assembling the first and second substrates together; and dividing the assembled substrates into liquid crystal display panels.

31 Claims, 14 Drawing Sheets

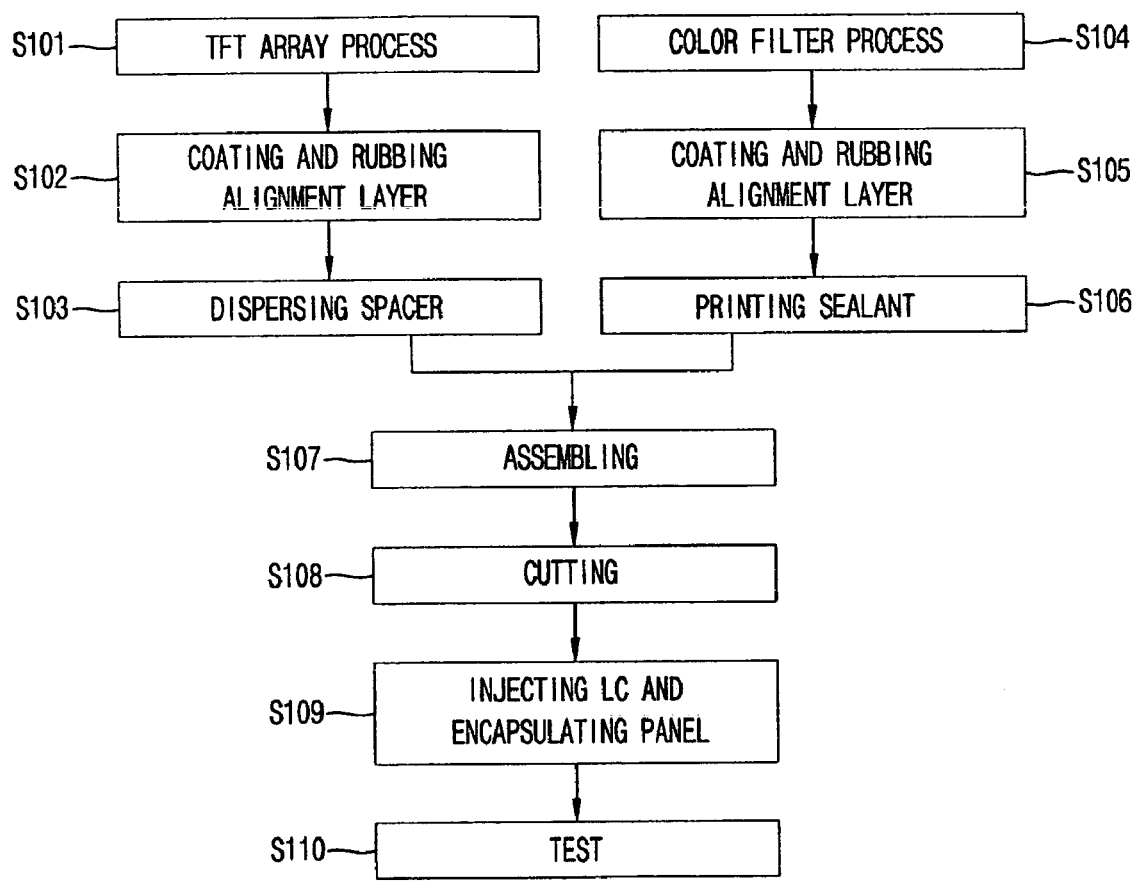

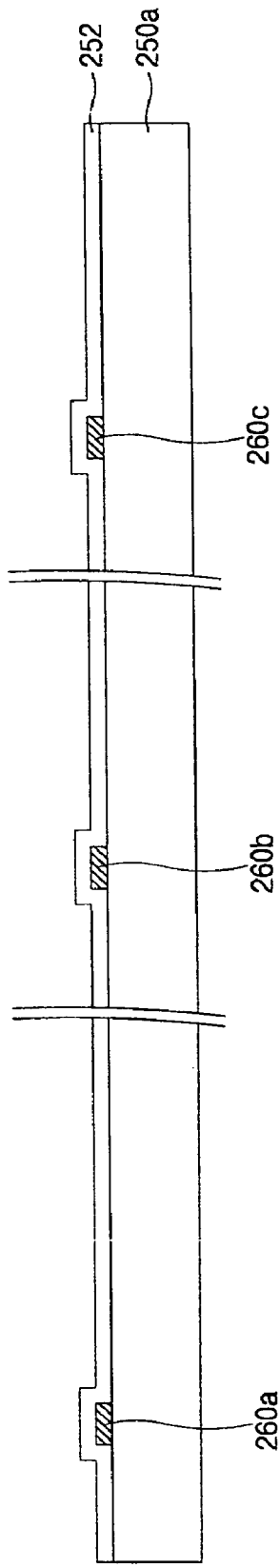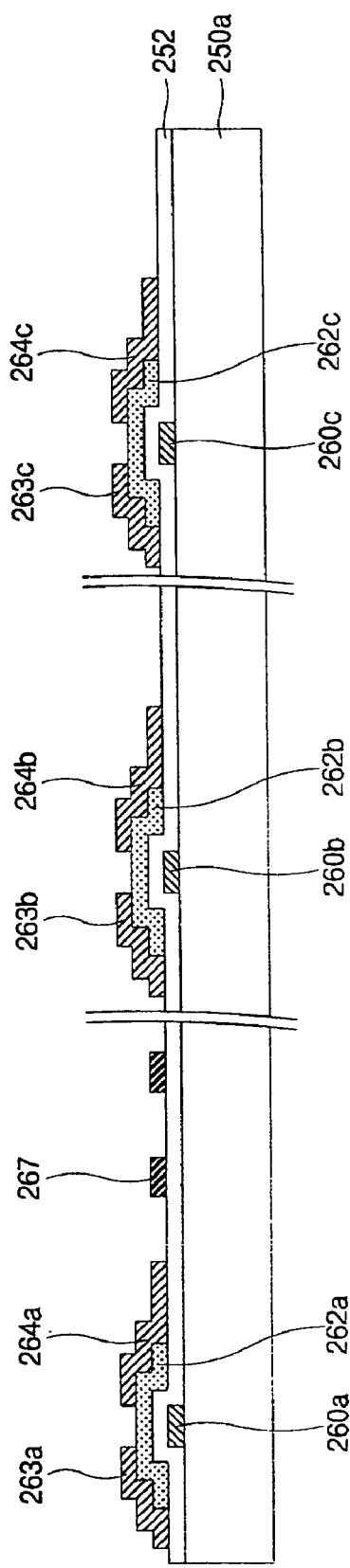

METHOD OF FABRICATING LIQUID CRYSTAL DISPLAY DEVICES HAVING VARIOUS DRIVING MODES ON A COMMON SUBSTRATE

This application claims the benefit of Korean Patent Application Nos. 41726/2003 and 26369/2004 filed on Jun. 25, 2003 and Apr. 16, 2004, which are hereby incorporated by reference for all purposes as if fully set forth herein.

BACKGROUND OF THE INVENTION

1. Field of the Invention

The present invention relates to a method of fabricating a liquid crystal display device, and particularly to a method of fabricating a liquid crystal display device capable of improving the efficiency of a glass substrate and reducing the fabrication cost by fabricating liquid crystal display devices having various sizes various driving modes on a glass substrate.

2. Description of the Related Art

In general, a liquid crystal display device is a display device in which data signals including picture information are individually supplied to liquid crystal cells arranged in a matrix form, and the optical transmittance of the liquid crystal cells is controlled to display an image.

FIG. 1 is a plan view showing the structure of a liquid crystal display device according to the related art.

In FIG. 1, the liquid crystal display device 10 includes an attached driving element array substrate 1 and color filter substrate 2. The liquid crystal display device also includes an image displaying unit 13 where a plurality of pixels are arranged in a matrix form and a gate pad unit 14 and a data pad unit 15 respectively connected to gate lines and data lines of the image displaying unit 13. The driving element array substrate 1 has a region along a long side and region along a short side that protrudes beyond the color filter substrate 2. The gate pad unit 14 is formed in the region along the short side region protruding from the driving element array substrate 1 and the data pad unit 15 is formed in the region along the long side region protruding from the driving element array substrate 1.

A scanning signal is applied to the gate lines of the image displaying unit 13 by a gate driving unit through the gate pad unit 14, and an image signal is applied to the data line of the image displaying unit 13 by a data driving unit through the data pad unit 15.

The image displaying unit 13 of the liquid crystal display device 10 includes a plurality of pixels defined by a plurality of data lines to which the image signal is applied and a plurality of gate lines to which the scan signal is applied. Each pixel has a pixel electrode and a thin film transistor on the driving element array substrate I that applies the image signal to the pixel electrode.

The image displaying unit 13 of the color filter substrate 2 has a color filter for displaying color images and a common electrode facing the pixel electrode over the driving element array substrate 1.

The driving element array substrate 1 and the color filter substrate 2 face each other and are attached by a sealant (not shown) printed along an outer edge of the image displaying unit 13. A liquid crystal layer is placed between the attached driving element array substrate 1, and the color filter substrate 2 and a spacer is placed therebetween to maintain a uniform cell gap.

In order to fabricate this liquid crystal display device, a plurality of driving element array substrates is formed on a large substrate made of glass or the like, and a plurality of color filter substrates is formed on a separate large substrate. Thereafter, the two large substrates are assembled (i.e., attached) to each other to form a plurality of liquid crystal display panel regions and are cut into individual liquid crystal display panels.

The process of fabricating the liquid crystal display device may be divided into a driving element array substrate process for forming the driving elements on the driving element array substrate 1, a color filter substrate process for forming the color filter on the color filter substrate 2, and a cell process. These processes of forming a liquid crystal display device will now be described using the accompanying FIG. 2.

In the driving element array substrate process, first, a plurality of gate lines and a plurality of data lines defining a plurality of pixel areas are formed on a driving element array substrate 1 and thin film transistors, or driving elements, are formed and connected to the gate lines and the data lines at each pixel area (S101). Further, the pixel electrode connected to the thin film transistor is formed on the driving element array substrate to drive the liquid crystal layer with the signal applied trough the thin film transistor.

Next, the color filter layer with R, G and B (red, green and blue) colors and the common electrode are formed on the color filter substrate 2 using the color filter process (S104).

Thereafter, alignment layers are deposited over the driving element array substrate and the color filter substrate, and then the alignment layers are rubbed in order to provide an alignment controlling force and/or a surface anchoring force (i.e., so as to set a pre-tilt angle and orientation direction) to the liquid crystal molecules in the liquid crystal layer (S102, S105).

Subsequently, a plurality of spacers is dispersed onto the driving element array substrate 1 to maintain a uniform cell gap between the driving element array substrate 1 and the color filter substrate 2. The sealing material is deposited along the outer edge portion of the color filter substrate 2 and the substrates are compressed to attach the substrates (S103, S106, S107).

The driving element array substrate 1 and the color filter substrate 2 are large glass substrates. In other words, because a plurality of panel regions including the thin film transistor and the color filter are formed on the large glass substrates, the glass substrate is cut to fabricate the individual liquid crystal display panel. (S108). Thereafter, the liquid crystal material is injected into the individual liquid crystal display panels through a liquid crystal injection opening, and then the liquid crystal injection opening is encapsulated to form the liquid crystal layer. Finally, the injected liquid crystal display panel is tested (S109, S110).

Generally, the glass substrate may include a plurality of liquid crystal display panels, for example, 4, 6, 8 or 16 liquid crystal display panels. The technology used to form the plurality of liquid crystal display panels on the glass substrate is a primary factor that determines fabrication efficiency of the liquid crystal display device. Accordingly, techniques for more efficiently using the glass substrate have been studied. Today as large liquid crystal display devices are in greater demand, the fabrication technology affects the competitiveness of liquid crystal display device manufacturers.

In general, as shown in FIG. 3A, liquid crystal display panels 10 having the same size are formed on the glass substrate 20. The glass substrate 20 should have an area large enough to form a plurality of the liquid crystal display panels 10 thereon at set intervals. The glass substrate 20 with the plurality of the liquid crystal display panels 10 is separated to form a plurality of individual liquid crystal display panels 10 leaving behind a region of the glass substrate 20 between the liquid crystal display panels 10 which is discarded after separation. Therefore, the glass substrate 20 may be formed to minimize the interval between liquid crystal display panels 10.

The size of the glass substrate 20 is standardized and depends on the size of the liquid crystal display panel 10 being fabricated. Namely, the standard size of the glass substrate 20 is set so that the glass substrate 20 has an area to most efficiently fabricate the liquid crystal display panels 10. As shown in FIG. 3B, when liquid crystal display panels with a different size need to be fabricated on the standard sized glass substrate 20, a large region of the glass substrate 20 remains unused. This problem may be solved by forming the liquid crystal display panel 10 on a glass substrate 20 with a standard size corresponding to the liquid crystal display panel 10 to be made. But, there may be no glass substrate that is standardized according to the liquid crystal display panel to be made, so the liquid crystal display panel 10 must be formed on a glass substrate 20 with a different standard as shown in FIG. 3B. Accordingly, a large portion of the glass substrate remains unused, and thus the unused region of the glass substrate is discarded, thus increasing the fabrication cost of the liquid crystal display device.

SUMMARY OF THE INVENTION

Accordingly, the present invention is directed to a method of fabricating a liquid crystal display device having various driving modes that substantially obviates one or more of the problems due to limitations and disadvantages of the related art.

An advantage of the present invention is to provide a method of fabricating a liquid crystal display device capable of efficiently using a glass substrate by forming liquid crystal display panels of various standard sizes on one glass substrate.

Another advantage of the present invention is to provide a method of fabricating a liquid crystal display device capable of remarkably reducing a fabrication cost by fabricating liquid crystal display panels of driving modes different from one another on one glass substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, includes a method of fabricating a liquid crystal display device, including: forming alignment layers over a first substrate and a second substrate, wherein the first and second substrates have a first region and a second region, the first and second regions each including a panel region, wherein a panel region in the first region has a different driving mode than a panel in the second region; producing a first alignment direction in the alignment layers of the first region; producing a second alignment direction in the alignment layers of the second region; assembling the first and second substrates together; and dividing the assembled substrates into liquid crystal display panels.

In another aspect of the present invention, method of fabricating a liquid crystal display device, includes: forming alignment layers on a first substrate and a second substrate with a plurality of regions, the regions each including a panel region, wherein a panel region in a first region has a different driving mode than a panel in another region; producing a predetermined alignment direction on the alignment layer in each panel region of the regions; and forming a liquid crystal display panel by assembling the first and second substrates together and dividing the assembled substrates.

In another aspect of the present invention, a method of fabricating a liquid crystal display device, includes: forming a first substrate with a first and second region, wherein the first and second region have a panel region; forming a second substrate with first and second regions corresponding to the first and second regions of the first substrate, wherein the first and second regions have panel regions corresponding to the panel regions of the first substrate; assembling the first and second substrates together; and dividing the assembled substrates into liquid crystal display panels, wherein the liquid crystal display panels have different sizes.

In another aspect of the present invention, a method of fabricating a liquid crystal display device, providing a first substrate including an in plane switching (IPS) panel region, a vertical alignment (VA) panel region, and a twisted nematic (TN) panel region; forming thin film transistors in the IPS panel region, the VA panel region, and the TN panel region; forming pixel electrodes in the VA panel region and the TN panel region; forming at least one pair of electrodes in the IPS panel region to introduce horizontal electric field; forming a first alignment layer over the first substrate; providing a first alignment direction on the first alignment layer in the TN panel region by first aligning the first alignment layer; and providing a second alignment direction on the first alignment layer in the IPS panel region.

In another aspect of the present invention, a multiple liquid crystal display device includes: a first substrate with first and second regions, wherein the first and second regions have a panel region; gate lines and data lines on the first substrate substantially perpendicular to one another defining pixel regions in the panel regions; thin film transistors in the pixel regions connected to the gate and data lines; a first alignment layer on the first substrate in the first region; a second alignment layer on the first substrate in the second region; a second substrate with first and second regions corresponding to the first and second regions of the first substrate, wherein the first and second regions have a panel region corresponding to the panel regions on the first substrate; a color filter layer on the second substrate; a third alignment layer on the second substrate in the first region; a fourth alignment layer on the second substrate in the second region; a liquid crystal layer between the first and second substrates; and seals between the first and second substrates corresponding to the panel regions that contain a liquid crystal between the first and second substrate.

In another aspect of the present invention, a multiple liquid crystal display device comprising: first substrate with first and second regions, wherein the first and second regions have a panel region; gate lines and data line on the first substrate substantially perpendicular to one another defining pixel regions in the panel regions; thin film transistors in the pixel regions connected to the gate and data lines; a second substrate with first and second regions corresponding to the first and second regions of the first substrate, wherein the first and second regions have a panel region corresponding to the panel regions on the first substrate; a color filter layer on the second substrate; a liquid crystal layer between the first and second substrates; and seals between the first and second substrates corresponding to the panel regions that contain a liquid crystal between the first and second substrate; wherein the panel region of the first region has a different area from the area of the panel region in the second region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings:

FIG. 2 is a flow chart of a method of fabricating a related art liquid crystal display device;

FIG. 9A-FIG. 9E are plan views showing a method of fabricating the liquid crystal display device.

DETAILED DESCRIPTION OF THE PREFERRED EMBODIMENTS

Reference will now be made in detail to the illustrated embodiments of the present invention, examples of which are illustrated in the accompanying drawings.

Figure 4:
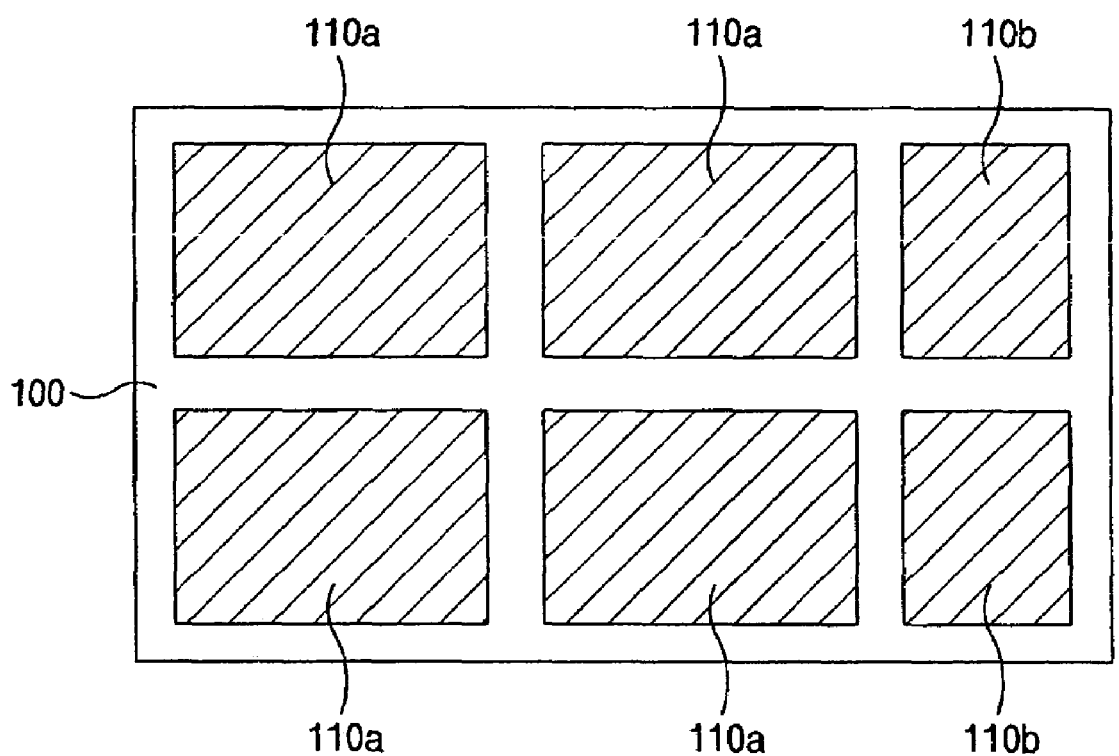
FIG. 4 shows a plurality of liquid crystal display panels having different sizes, formed on a glass substrate according to the present invention.

FIG. 4 shows a plurality of liquid crystal display panels 110a, 110b having different sizes, formed on a glass substrate 100 according to the present invention.

Figure 1:
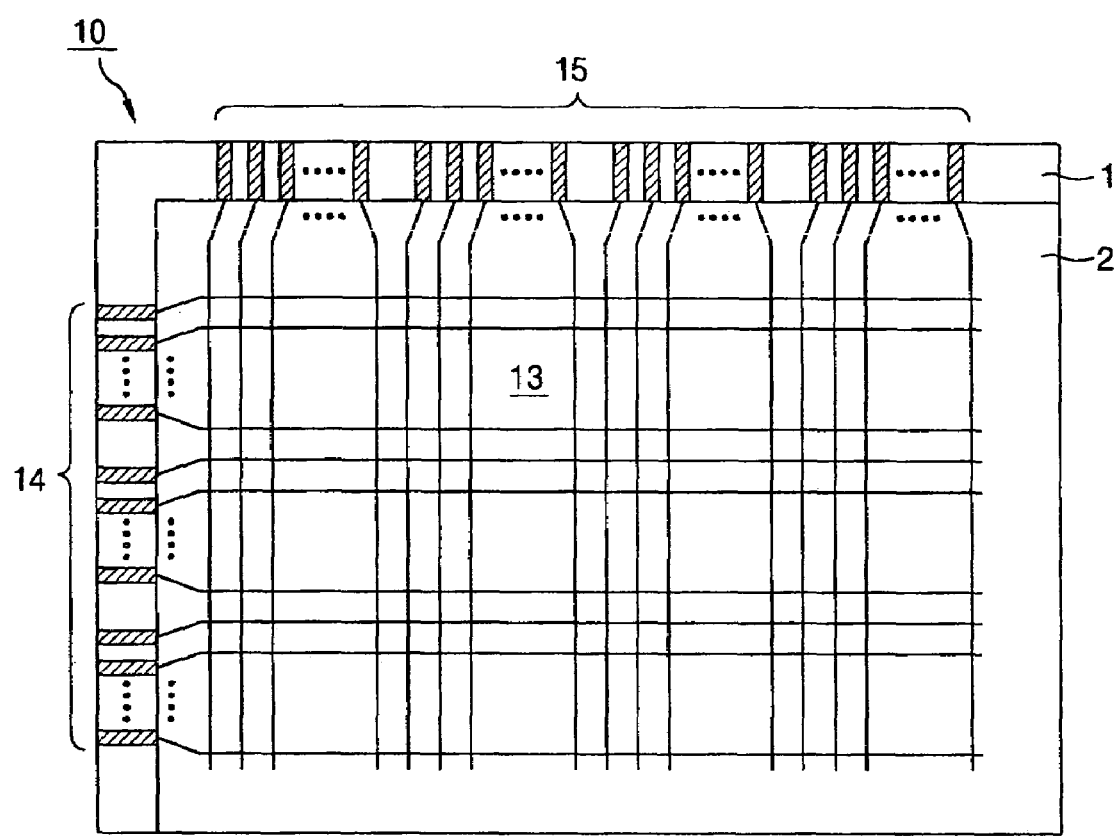
FIG. 1 is a plan view showing the structure of a liquid crystal display device according to the related art.
Figure 3A:
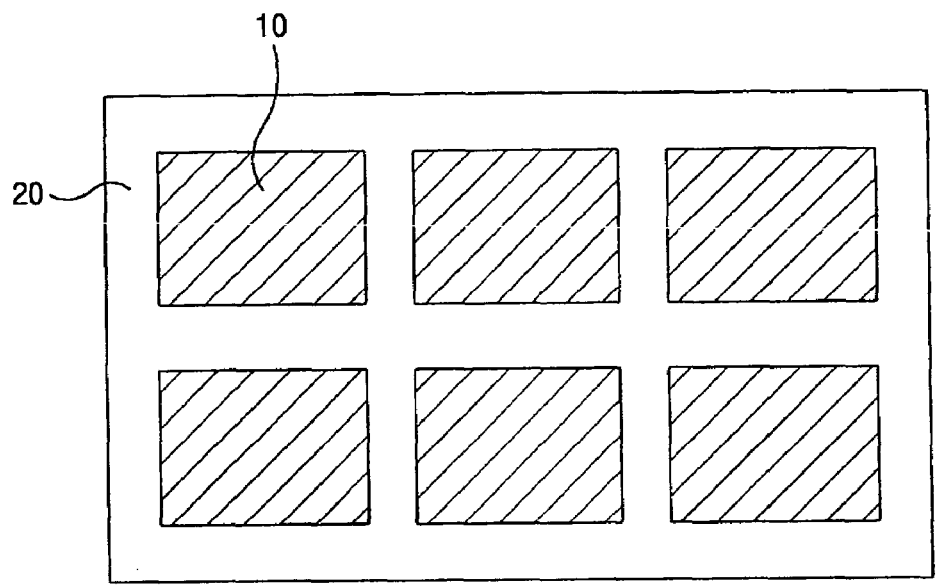
FIGS. 3A and 3B show a plurality of liquid crystal display panels formed on a glass substrate according to the related art.
Figure 3B:
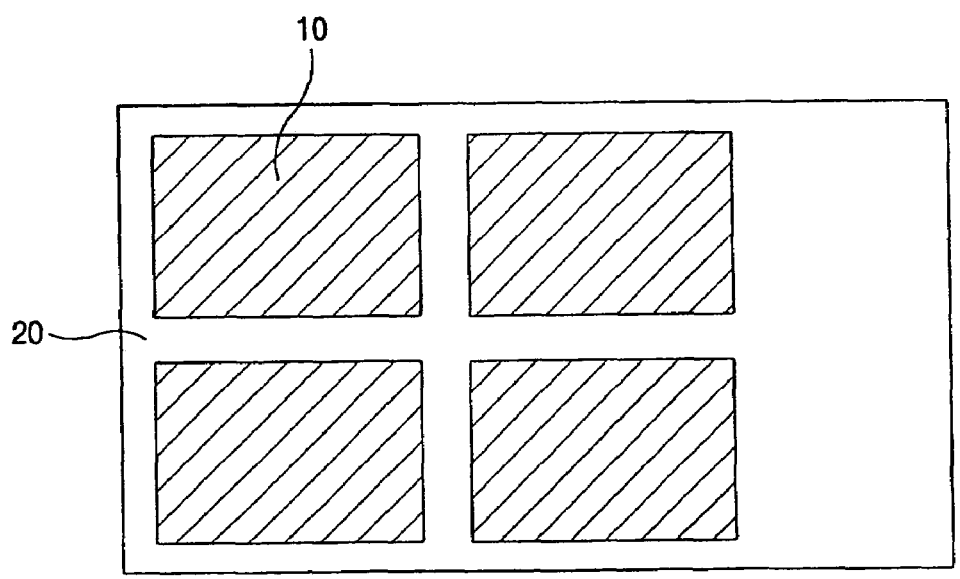

Four first liquid crystal display panels 110a having a first size and two second liquid crystal display panels 110b having a second size are formed on the glass substrate 100. Unlike the glass substrate shown in FIG. 3B on which only four liquid crystal display panels are formed, on the same-sized glass substrate 100 six liquid crystal display panels 110a, 110b, maybe formed so that more liquid crystal display panels may be fabricated with the same glass substrate cost. Accordingly, the fabrication cost of the liquid crystal display panels is reduced.

On the glass substrate 100, liquid crystal display panels having various sizes may be formed. Specifically, the liquid crystal display panels of various standard sizes that most efficiently occupy the glass substrate 100 may be formed on the glass substrate 100. Various liquid crystal display panels such as for televisions, notebook computers, or mobile phones may be formed on one glass substrate 100, efficiently.

Figure 5A:
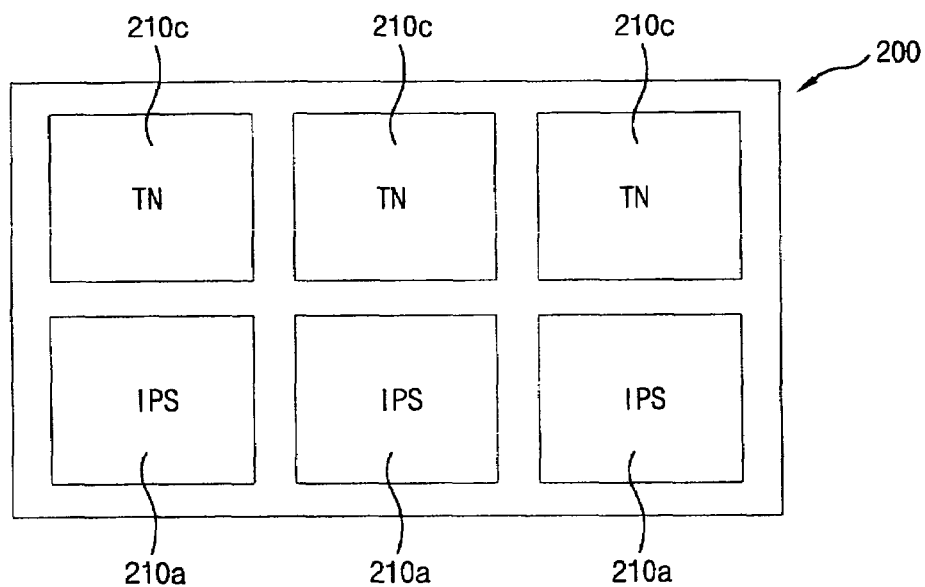
FIGS. 5A through 5C show a plurality of liquid crystal display panel having different driving modes, formed on a glass substrate in accordance with the present invention.
Figure 5B:
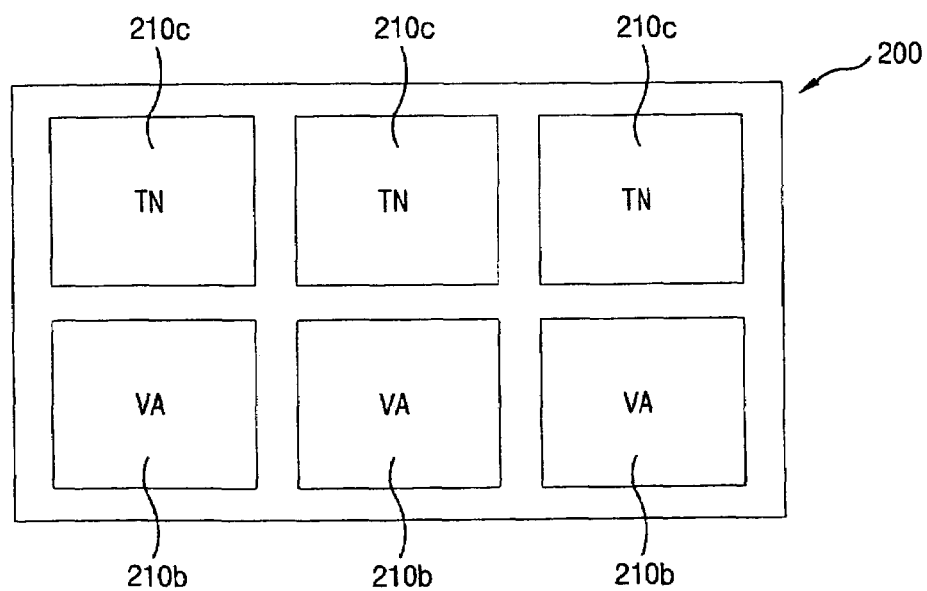
Figure 5C:
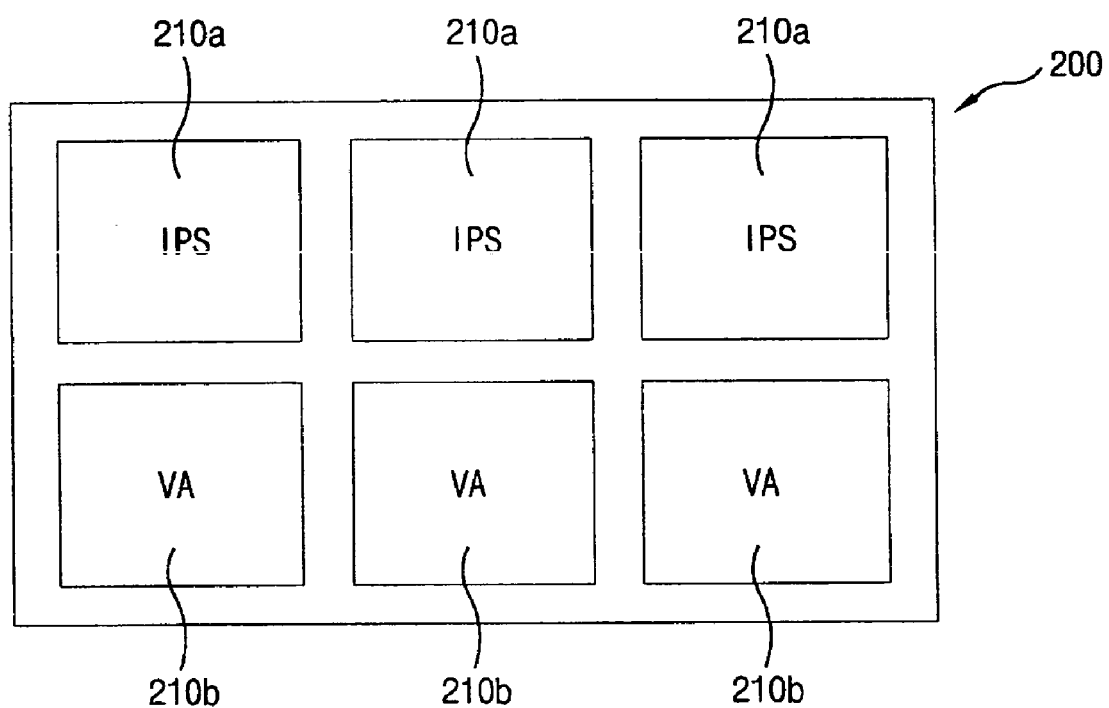

In addition, on one glass substrate, not only liquid crystal display panels having different sizes, but also liquid crystal display panels having different driving modes may be formed. FIGS. 5A through 5C show that the liquid crystal display panels 210a, 210b, 210c having different driving modes from each other are formed on one glass substrate 200.

FIG. 5A shows that TN (Twisted Nematic) mode liquid crystal display panels 210c and IPS (In Plane Switching) mode liquid crystal display panels 210a are formed on the glass substrate 200. FIG. 5B shows that TN mode liquid crystal display panels 210c and VA (Vertical Alignment) mode liquid crystal display panels 210b are formed on the glass substrate 200. FIG. 5C shows that IPS mode liquid crystal display panels 210a and VA mode liquid crystal display panels 210b are formed on the glass substrate 200.

As shown in FIGS. 5A through 5C, because liquid crystal display panels having various modes such as TN mode, IPS mode and VA mode may be formed on one substrate 500, there is no need for separate manufacturing lines for each driving mode. Accordingly, only one fabrication line is needed to fabricate liquid crystal display devices having various modes that are used in various electronics products.

Figure 6:
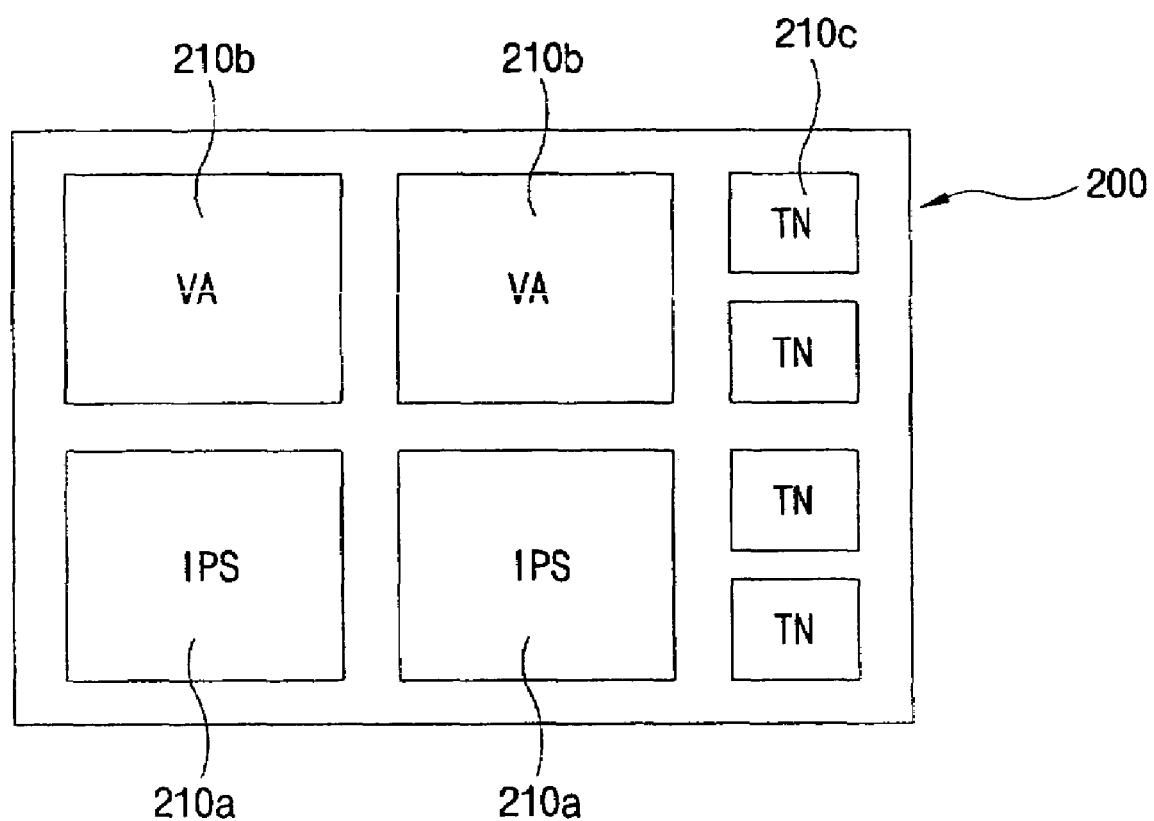
FIG. 6 shows a plurality of liquid crystal display panels having different driving modes and different sizes, formed on a glass substrate in accordance with the present invention.

In FIGS. 5A through 5C, the liquid crystal display panels 210a, 210b, 210c having different driving modes and the same sizes are formed on the glass substrate 200. But, as shown in FIG. 6, the liquid crystal display panels 210a, 210b, 210c having different driving modes and different sizes may be formed on the glass substrate 200.

A method of fabricating the liquid crystal display device using the glass substrate including liquid crystal display panels having various driving modes are described in the accompanying drawings.

Figure 7:
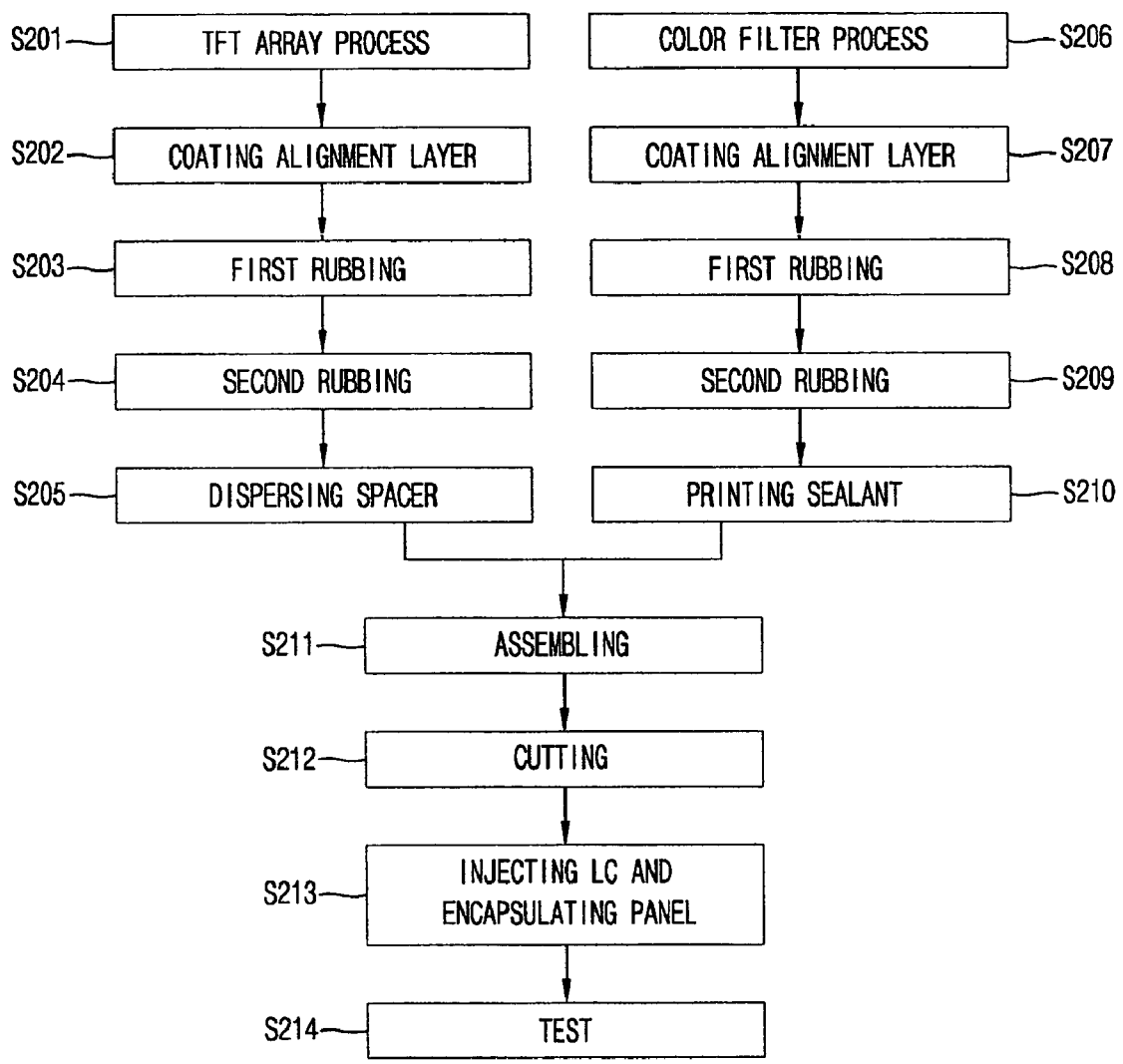
FIG. 7 is a flow chart of a method for fabricating a liquid crystal display device in accordance with the present invention.
Figure 8:
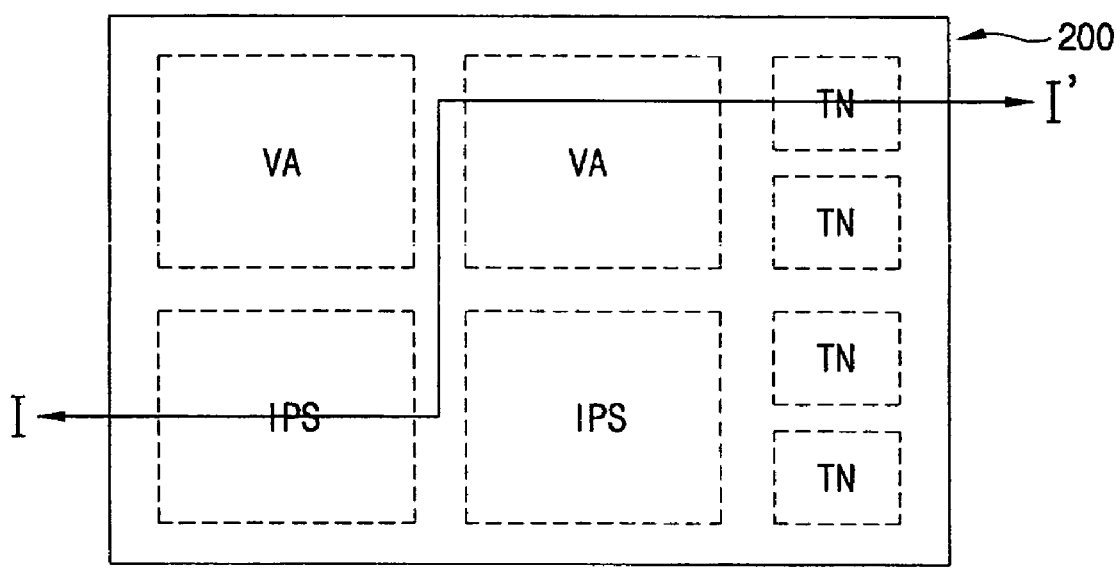
FIG. 8 shows a glass substrate having a plurality of panel regions.

FIG. 7 is a flow chart showing a method of fabricating liquid crystal display devices using a glass substrate having liquid crystal display panels of various modes, and FIG. 8 is a drawing showing a glass substrate including a TN panel region, an IPS panel region, and a VA panel region in which a TN mode panel, IPS mode panel and VA mode panel are respectively formed. Further, FIGS. 9A-9E are sectional views along the line I-I' of FIG. 7 to show the process of fabricating the liquid crystal display devices.

First, as shown in FIG. 7, a plurality of gate lines and a plurality of data lines that define a plurality of pixel areas are formed in the IPS panel region, the VA panel region, and the TN panel region on the driving element array substrate using the driving device array process, and thin film transistors connected to the gate lines and the data lines are formed at each pixel area (S201).

In addition, a color filter layer with R, G and B (red, green and blue) colors are formed in the IPS panel region, the VA panel region, and the TN panel region on the color filter substrate using the color filter process (S206).

Hereinafter, the manufacturing process for the driving device array and the color filter will be described in detail.

As shown in FIG. 9A, gate electrodes 260a, 260b, 260c are respectively formed in the IPS panel region, the VA panel region and the TN panel region on the first substrate 250a, and then a gate insulating layer 252 is formed over the first substrate 250a.

Next, as shown in FIG. 9B, semiconductor layers 262a, 262b, 262c, source electrodes 263a, 263b, 263c, and drain electrodes 264a, 264b, 264c are formed in the IPS panel region, the VA panel region and the TN panel region. The semiconductor layers 262a, 262b, 262c, the source electrodes 263a, 263b, 263c, and the drain electrodes 264a, 264b, 264c may be formed by a photolithography process using a photoresist and a mask. The semiconductor material is deposited over the first substrate 250a and etched using the mask to form the semiconductor layers 262a, 262b, 262c. Subsequently, the metal is deposited over the first substrate 250a and then etched using another mask to form the source electrodes 263a, 263b, 263c and the drain electrodes 264a, 264b, 264c. Not shown in the figures, the semiconductor layers 262a, 262b, 262c may include intrinsic semiconductor layer formed of amorphous silicon (a-Si) or poly-crystalline silicon (p-Si) and a $n^+$ layer having impurities.

Further, the semiconductor layers 262a, 262b, 262c, the source electrodes 263a, 263b, 263c, and the drain electrodes 264a, 264b, 264c may be formed using a diffraction mask (or half-tone mask). In this process, the semiconductor material and the metal is continuously deposited over the first substrate 250a. The photoresist layer is also formed on the metal layer and diffractively exposed to form the semiconductor layers 262a, 262b, 262c, the source electrodes 263a, 263b, 263c, and the drain electrodes 264a, 264b, 264c. That is, when a diffraction mask is used, the semiconductor layers 262a, 262b, 262c, the source electrodes 263a, 263b, 263c, and the drain electrodes 264a, 264b, 264c are formed using a one mask process.

In the IPS panel region over the first substrate 250a, a common electrode 267 is formed. This common electrode 267 may be made of same metal as the source electrode 263a, 263b, 263c and the drain electrode 264a, 264b, 264c in the source/drain process. In this case, the common electrode 267 may be formed at the same time as the source electrodes 263a, 263b, 263c and the gate electrodes 264a, 264b, 264c. Also, the common electrode 267 may be made of a different metal from the source electrode 263a, 263b, 263c and the drain electrode 264a, 264b, 264c.

Figure 9C:
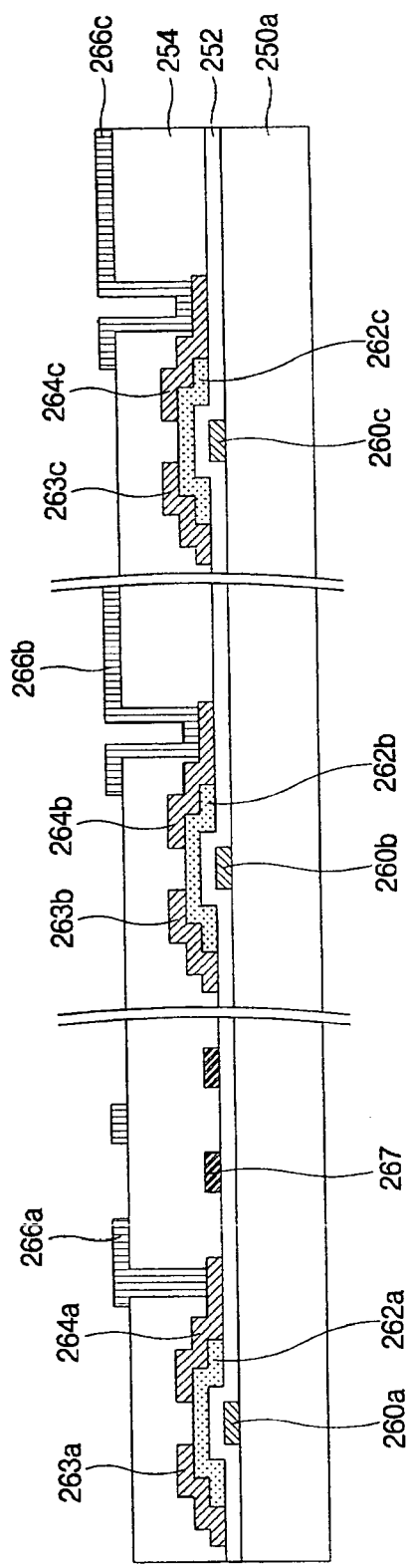

A passivation layer 254 is formed over the first substrate 250a as shown in FIG. 9C. Subsequently, a pixel electrode 266a is formed in the IPS panel region on the passivation layer 254. The common electrode 266a is disposed substantially parallel with the common electrode 267 to form the horizontal electric field parallel with the surface of the first substrate 250a. In the VA panel region and the TN panel region the pixel electrodes 266b, 266c are formed on the passivation layer 254. At this time, the pixel electrodes 266a, 266b, 266c are connected to the drain electrodes 262a, 262b, 262c through a contact hole in the passivation layer 254. The pixel electrodes 266a, 266b, 266c are formed of transparent material such as ITO (Indium Tin Oxide).

The common electrode 267 and the pixel electrode 266a in the IPS panel region may be formed of various materials and in the various positions. The common electrode 267 and the pixel electrode 266a may also be disposed in the same layer such as on the first substrate 250a, the gate electrode layer 252, or the passivation layer 254. Further, the common electrode 267 and the pixel electrode 266a may be disposed on different layers (for example, the common electrode 267 may be disposed on the first substrate 250a and pixel electrode may be disposed on the gate insulating layer 252, or the common electrode 267 may be disposed on the passivation layer 254 and pixel electrode may be disposed on the gate insulating layer 252).

Figure 9D:
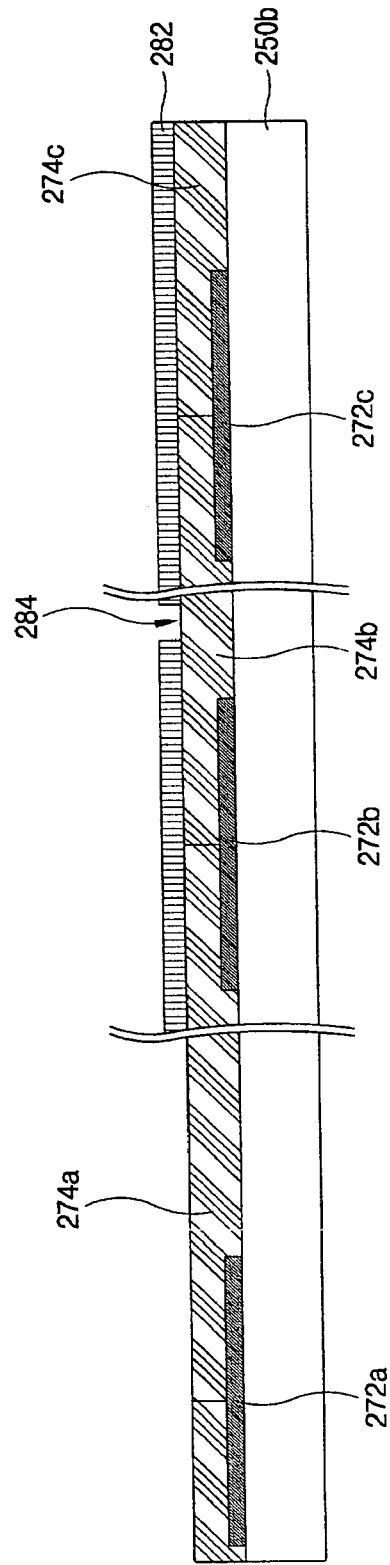

As shown in FIG. 9D, in the IPS panel region, the VA panel region and the TN panel region of the second glass substrate 250b, black matrixes 272a, 272b, 272c are formed and color filter layers 274a, 274b, 274c are formed thereon. The color filter layers 274a, 274b, 274c include R (Red), G (Green), B (Blue) color elements. Further, a common electrode 282 formed of transparent metal such as ITO is formed in the VA panel region and the TN panel region. A part of the common electrode in the VA panel region is removed to form a slit 284. Not shown in figure, an overcoat layer may be formed on the color filter layer 274a, 274b, 274c.

The VA panel region may be divided into a plurality of domains by the slit 284 to improve the viewing angle characteristic of the liquid crystal display panel. Because of the slit 284, the electric field between the pixel electrode 266b and the common electrode 282 is distributed in substantially symmetric around the slit 284 (that is, the VA panel region is thereby divided into a plurality of domains around this slit 284). The liquid crystal molecules have different directions around the slit 284 along the electric field, so that the direction of the main viewing angle may be compensated to improve the viewing angle characteristic. Not shown in figure, the VA panel region may be divided into a plurality of domains by other structures, such as a protrusion in the common electrode 282, a hole in the color filter layer 274, a slit in the pixel electrode 266b or a protrusion on the first substrate 250a. Further, the VA panel region may be divided into a plurality of domains by an auxiliary electrode on the layer on which the gate electrode 260b or the source/drain electrodes 263b, 264b at the pixel electrode 266b are formed. The electric field between the pixel electrode and the common electrode 282 is distorted by the auxiliary electrode, so that the domains are formed. In addition, a plurality of domains may be formed by the slit, the protrusion or the auxiliary electrode at the first substrate 250a and the slit or protrusion at the second substrate 250b.

As described above, after the thin film transistors and the color filter layers are formed in the first and second substrate 250a, 250b by the driving device array process and the color filter process, alignment layers are respectively deposited on the driving element array substrate and the color filter substrate (S203, S207), and the alignment layers are formed on the driving element array substrate and the color filter substrate by rubbing or some other method (S203, S208). While the direction of the alignment layer may be formed using various techniques, rubbing the alignment layer is a common technique and will be used as an example of how to form the alignment layer throughout the description of the present invention.

A liquid crystal display device is a display device that displays an image by controlling the amount of light transmitted by the liquid crystal layer. The transmission level is controlled by an initial alignment state of the liquid crystal molecules having a double refraction property and by driving the liquid crystal molecules according to a signal. The driving mode of the liquid crystal display devices are determined by the initial alignment state and the method of driving the liquid crystal molecules. Because liquid crystal display devices with different driving modes have different initial alignment directions, the directions of the alignment layers have to be different.

Figure 10A:
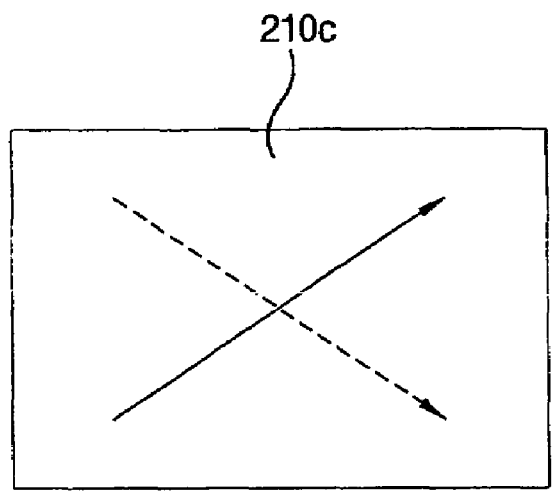
FIG. 10A shows an alignment direction of a TN mode liquid crystal display device.
Figure 10B:
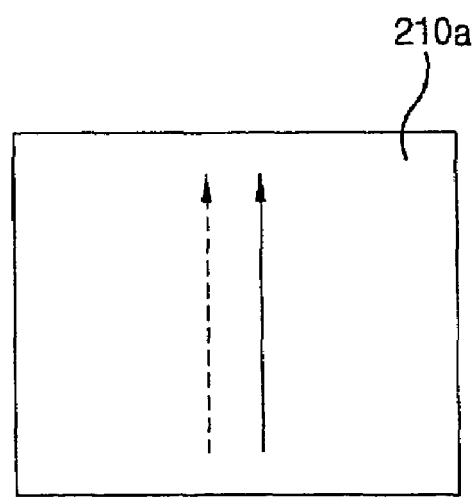
FIG. 10B shows an alignment direction of an IPS mode liquid crystal display device.

FIGS. 10A and 10B show examples of the alignment directions of the liquid crystal display panels having the different modes. FIG. 10A shows the alignment direction in a TN mode liquid crystal display panel 210c, and FIG. 10B shows the alignment direction made in the IPS mode liquid crystal display panel 210a. In general, because an alignment process is not performed on the VA mode liquid crystal display panel, the alignment direction is not depicted in the VA mode liquid crystal display panel. However, an alignment process may be conducted in the VA mode liquid crystal display panel.

A dotted line in the drawing shows the alignment direction of the alignment layer of the driving element array substrate, and a solid line therein shows the alignment direction of the alignment layer of the color filter substrate. The gate lines and the data lines extend in directions substantially parallel to the edges of the substrates.

As shown In FIG. 10A, in the TN mode, the alignment directions of alignment layers respectively made in the driving element array substrate and the color filter substrate cross each other to be symmetric with reference to the gate lines.

As shown in FIG. 10B, in the IPS mode, the alignment directions of the alignment layers of the driving element array substrate and the color filter substrate are respectively formed to be parallel to the direction in which the data lines extended. In the IPS mode, the alignment directions may be formed at an angle to the data lines (for example, about 15°), but the alignment directions of the driving element array substrate and the color filter substrate have to be substantially parallel.

In the IPS mode display device, the panel regions having the different modes, respectively formed on the substrates (the driving element array substrate and the color filter substrate) have to be formed in directions different from each other. During the first rubbing process, the alignment layer for liquid crystal display panels having a first mode is respectively formed on the driving element array substrate and the color filter substrate.

Figure 11A:
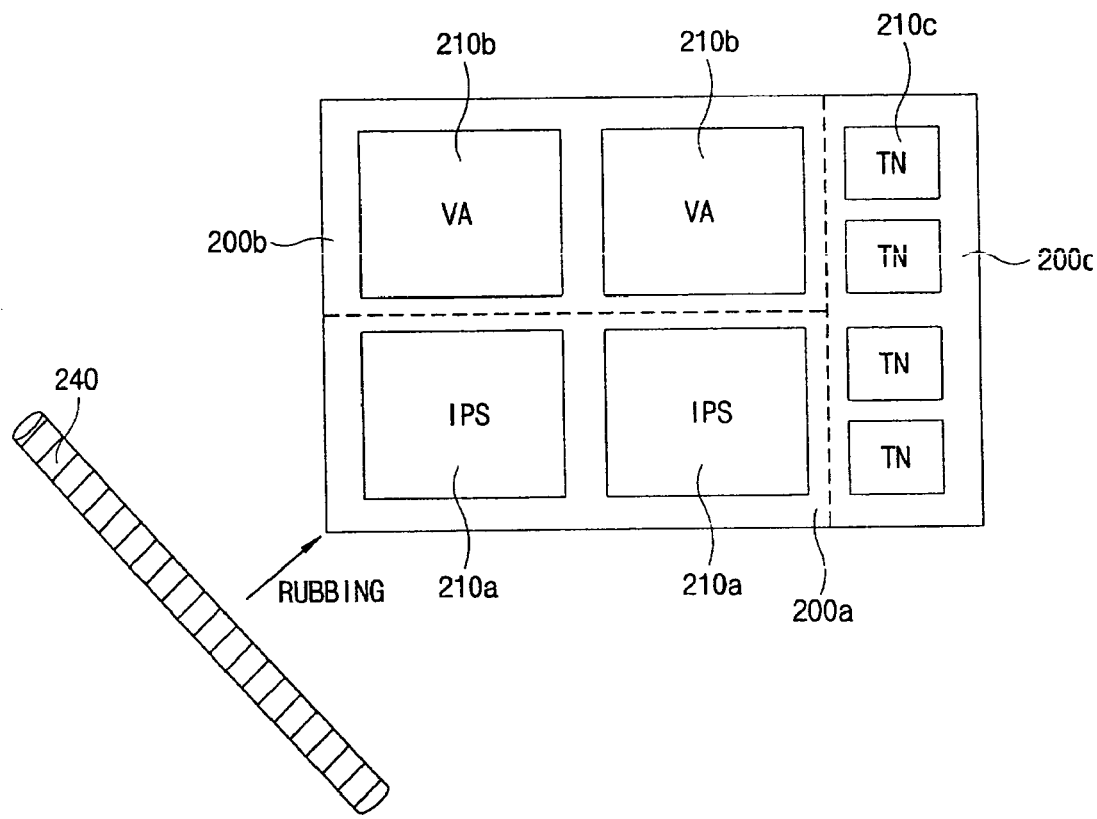
FIGS. 11A and 11B show rubbing methods employed in the present invention.

As shown in FIG. 11A, a rubbing roll 240 has a rubbing cotton around its circumference. A first rubbing is made in such a manner that the rubbing roll is disposed at an angle (for example, about 45°) to a direction parallel to the data lines that the rubbing roll 240 proceeds. Then the rubbing roll 240 or the substrate 200 is moved to rub the TN panel region 200c of the glass substrate, in which the TN mode liquid crystal display panel 210c is formed. During the first rubbing, the IPS panel region 200a and the VA panel region 200b are blocked by a mask or the photoresist to provide the alignment controlling force to only the TN mode liquid crystal display panel 210c. At this time, the direction that the rubbing roll 240 is disposed depends on the direction that the liquid crystal display panel 210c on the glass substrate 200 is disposed. That is, the direction that the rubbing roll 240 is disposed depends on whether the gate line of the liquid crystal display panel extends in an x-axial direction or in a y-axial direction. In addition, by changing the disposition angle of the rubbing roll 240, the first rubbing for the driving element array substrate and the color filter substrate may be performed in directions different from each other.

Figure 11B:
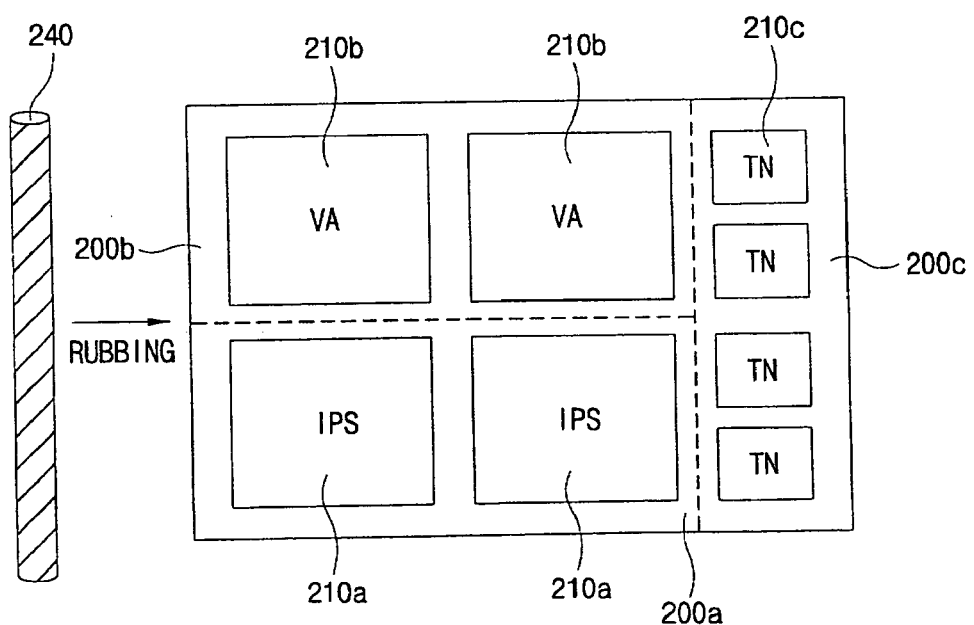

When the first rubbing is completed, a second rubbing is performed (S204, S209), and FIG. 11B shows the second rubbing.

As shown in FIG. 11B, the second rubbing is made in such a manner that a rubbing roll 240 is disposed at substantially a right angle to the direction that the rubbing roll 240 proceeds, and then the rubbing roll 240 or the substrate 200 is moved to rub the IPS panel region 200a of the glass substrate 200, in which the IPS liquid crystal display panel 210a has been formed. In this case, the VA panel region 200b and the TN panel region 200c are blocked by the mask or the photoresist to provide the alignment controlling force to only the IPS mode liquid crystal display panel 210b. Because the alignment directions formed on the driving array substrate and the color filter substrate are the same, repeating these processes provides the driving element array substrate and the color filter substrate with the desired alignment direction. This alignment direction may be provided by various alignment process such as light aligning process using an ultra-violet ray, ion beam aligning process using ion beam, and vapor deposition aligning process.

After forming the alignment layers on the driving element array substrate and the color filter substrate in a specific direction as described above, spacers that maintain a uniform cell gap are dispersed onto the driving element array substrate, and a sealing material is deposited along the outer edge of the color filter substrate. Then, the driving element array substrate and the color filter substrate are attached by compressing the driving element array substrate and the color filter substrate together (S205, S210, S211).

Figure 9E:
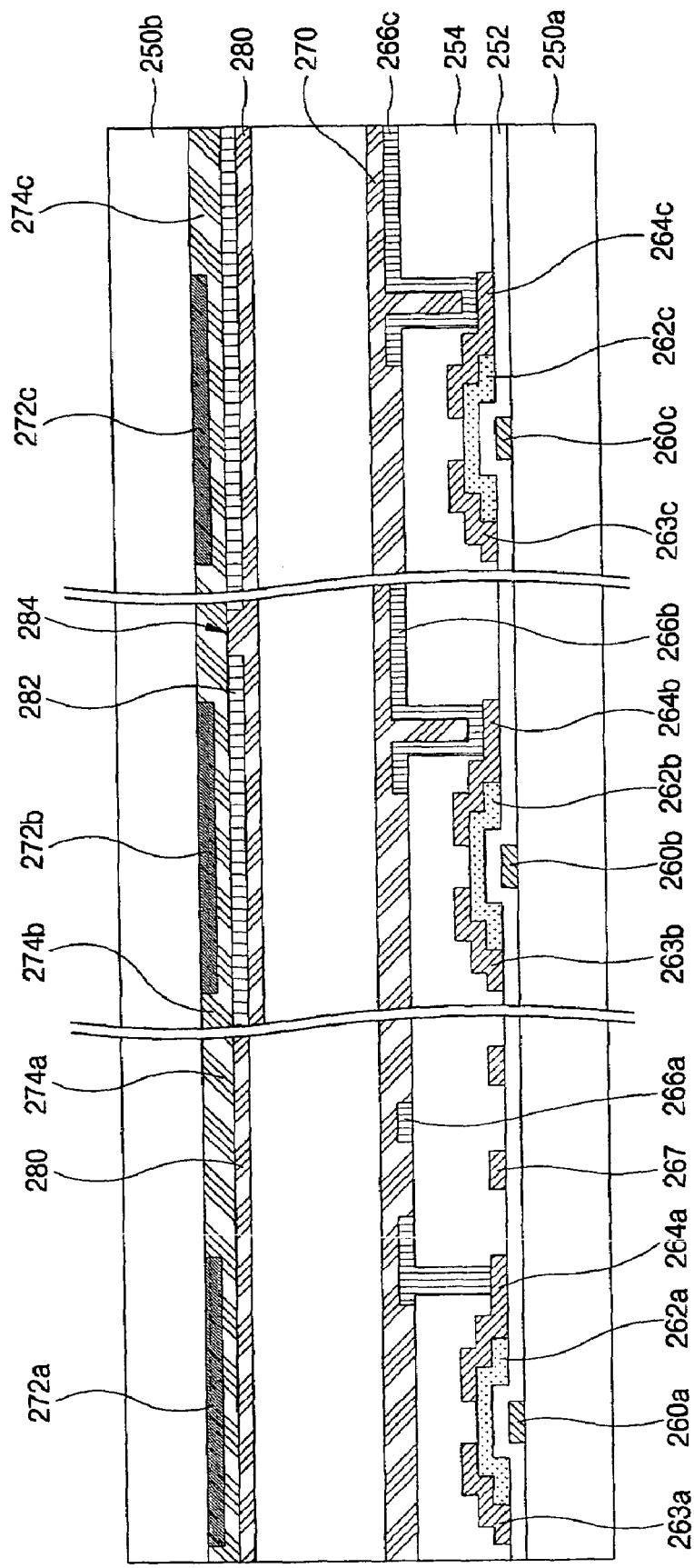

The attached first and second substrates 250a, 250b are shown in FIG. 9E. As shown in FIG. 9E, the alignment layers 270, 280 are formed over the first and second substrate 250a, 250b and the different alignment controlling forces (i.e., the different alignment directions) may be provided to the alignment layer 270, 280 in the IPS panel region and the TN panel region by a rubbing process.

Thereafter, the first and second glass substrates are separated into separate liquid crystal display panels (S212). Next, a liquid crystal material is injected into the separate liquid crystal display panels through a liquid crystal injection hole, wherein the liquid crystal injection hole is then sealed to form the liquid crystal layer, and the injected liquid crystal display panel is tested (S213, S214). At this time, the liquid crystal material having the same characteristics may be introduced into the liquid crystal display panels having the different driving modes. Further, the liquid crystal material having different characteristics may be introduced into the liquid crystal display panels having the different driving modes. For example, the positive liquid crystal material is introduced into the TN mode liquid crystal display panel and the IPS mode liquid crystal display panel, and the negative liquid crystal material is introduced into the VA mode liquid crystal display panel.

In the method described above, the liquid crystal display device is completed by injecting liquid crystal into the individual liquid crystal display panels using a vacuum injection process. But, the present invention may be employed not only by using the vacuum injection method but also by using a liquid crystal dispensing method of directly dropping liquid crystal onto the glass substrate. In the latter case, the liquid crystal display device is fabricated by directly dropping liquid crystal onto a driving element array substrate or a color filter substrate in which panel regions of various modes are formed, by attaching the driving element array substrate and the color filter substrate together and by dividing the attached substrates into individual liquid crystal display panels.

In the present invention, because the liquid crystal display panels of various standard sizes are formed on one glass substrate, the glass substrate is more efficiently used, to thereby reduce fabrication costs. In addition, because liquid crystal display panels with various driving modes are formed on a single glass substrate, liquid crystal display panels with different driving modes may be formed on one fabrication line. Accordingly, there is no need for multiple fabrication lines to fabricate liquid crystal display panels with different driving modes, and thus reduce fabrication costs.

Various manufacturing processes for VA mode, IPS mode, and TN mode displays are described above. Any other variations in manufacturing displays with these different modes may also be used according to the present invention. U.S. Pat. No. 5,825,449 provides an example of a TN mode display manufacturing process, which is hereby incorporated by reference for all purposes as if fully set forth herein. U.S. Pat. Nos. 6,218,957 and 6,459,465 provide examples of a IPS mode display manufacturing process, which are hereby incorporated by reference for all purposes as if fully set forth herein. U.S. Pat. Nos. 6,356,335, 6,449,025, 6,462,798 and 6,473,142 provide examples of a VA mode display manufacturing process, which are hereby incorporated by reference for all purposes as if fully set forth herein. While the liquid crystal display device having any driving modes such as TN, IPS and VA modes have been discussed above, other types of liquid crystal display device may be used in the present invention, including for example a reflective type liquid crystal display device, a trans-reflective type liquid crystal display device, FLC (Ferro-electric Liquid Crystal) liquid crystal display device, and a poly-crystalline liquid crystal display device. Further, other flat panel display device such as an electro-luminescence may be used in the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   providing a first substrate and a second substrate having a first region and a second region, the first region including a plurality of first panel regions and the second region including a plurality of second panel regions to be separated into individual panels, each panel region in the first and the second regions including a plurality of pixel regions, the driving mode of the first panel regions being different from the driving mode of the second panel regions;
   forming alignment layers over a first substrate and a second substrate;
   rubbing the alignment layer of the first panel regions of the first and second substrates to produce a first alignment direction thereto;
   rubbing the alignment layer of the second panel regions of the first and second substrates to produce a second alignment direction thereto;
   assembling the first and second substrates together; and
   separating the first and second panel regions of the assembled substrates into respective first and second liquid crystal display panels,
   wherein the first and second alignment directions are respectively dependent upon the driving modes of the first and second panel regions and the first alignment direction in the first liquid crystal display panel is different from the second alignment direction in the second liquid crystal display panel.

2. The method of claim 1, wherein the first substrate is a thin film transistor substrate and the second substrate is a color filter substrate.

3. The method of claim 1, wherein the first driving mode and the second driving mode each include one of a twisted nematic mode, an in plane switching mode and a vertical alignment mode.

4. The method of claim 1, wherein producing the first alignment direction includes rubbing the alignment layer of the panel region in the first region in a first direction.

5. The method of claim 1, wherein introducing the second alignment direction includes rubbing the alignment layer of the panel region formed in the second region in a second direction.

6. The method of claim 1, wherein the panel regions of the first and second regions have the same area.

7. The method of claim 1, wherein the panel regions of the first region have a different area from the panel regions of the second region.

8. The method of claim 1, further comprising forming a liquid crystal layer between the divided first and second substrates.

9. The method of claim 1, further comprising dropping liquid crystal onto at least one substrate of the first and second substrates before assembling the first and second substrates together.

10. A method of fabricating a liquid crystal display device, comprising:
    forming alignment layers on a first substrate and a second substrate with a plurality of regions, the regions each including at least one panel region, the panel region including a plurality of pixels, wherein the panel region in a first region has a different driving mode than the panel region in another region;
    rubbing the alignment layer in each panel region of the regions to produce a predetermined alignment direction thereto; and
    forming a liquid crystal display panel by assembling the first and second substrates together and separating the panel regions of the assembled substrates into a plurality of liquid crystal display panels,
    wherein the alignment direction in each panel region is dependent upon the driving mode thereof.

11. The method of claim 10, wherein producing the alignment direction includes rubbing the alignment layers in the panel region in each region in the predetermined direction.

12. The method of claim 10, wherein the panel regions respectively formed in the regions have the same areas.

13. The method of claim 10, wherein the panel regions in the first region and in the other region have different areas from each other.

14. A method of fabricating a liquid crystal display device, comprising:
    forming a first substrate with a first and second regions, wherein the first and second regions each have at least one panel region having a plurality of pixels;
    forming a second substrate with first and second regions corresponding to the first and second regions of the first substrate, wherein the first and second regions have panel regions having a plurality of pixels, the first and second regions of the second substrate corresponding to the panel regions of the first substrate;
    forming first and second alignment layers in panel regions of the first and second regions respectively;
    rubbing the first and second alignment layers to produce different alignment directions thereto;
    assembling the first and second substrates together; and
    dividing the panel regions of the assembled substrates into a plurality of liquid crystal display panels, wherein the liquid crystal display panels have different sizes,
    wherein a driving mode of the panel regions in the first region is different from that of a driving mode of the panel regions in the second region and the alignment directions in the first region and the second region are dependent upon the driving modes thereof.

15. The method of claim 14, wherein forming the first substrate further comprises:
    forming gate and data lines defining pixel regions separately in each panel region; and
    forming a thin film transistor in each pixel region.

16. The method of claim 14, wherein the panel regions in the first region use a different driving mode than the panel regions in the second region.

17. The method of claim 16, wherein the driving mode of the first region includes one of a twisted nematic mode, an in plane switching mode and a vertical alignment mode.

18. The method of claim 16, wherein panel regions in the first region have the same area and panel regions in the second region have the same area which is different from the area of the panel regions in the first region.

19. The method of claim 16, wherein some panel regions in the first and second regions have a first area and some panel regions in the first and second regions have a second area.

20. The method of claim 14, further comprising dropping liquid crystal onto at least one substrate of the first and second substrates before assembling the first and second substrates together.

21. A method of fabricating a liquid crystal display device, comprising:
providing a first substrate including at least one in plane switching (IPS) panel region, at least one vertical alignment (VA) panel region, and at least one twisted nematic (TN) panel region;
forming respectively thin film transistors in the IPS panel region, the VA panel region, and the TN panel region;
forming respectively pixel electrodes in the VA panel region and the TN panel region;
forming at least one pair of electrodes in the IPS panel region to introduce horizontal electric field;
forming a first alignment layer over the first substrate;
rubbing the first alignment layer in the TN panel region to provide a first alignment direction thereby;
rubbing the first alignment layer in the IPS panel region to provide a second alignment direction thereto; and
separating the IPS panel region, TN panel region, and VA panel region from the first substrate to become individual panels,
wherein an alignment direction in the TN panel region is different from that in the IPS panel region.

22. The method of claim 21, further comprising:
providing a second substrate having an IPS panel region, a VA panel region, and a TN panel region;
forming black matrix and color filter layers over the second substrate;
forming a common electrode in the VA panel region and the TN panel region;
forming a second alignment layer over the second substrate;
providing a third alignment direction on the second alignment layer in the TN panel region;
providing a fourth alignment direction on the second alignment layer in the IPS panel region; and
forming liquid crystal display panels.

23. The method of claim 22, wherein forming liquid crystal display panels includes:
dropping liquid crystal on the surface of at least one of the first substrate and the second substrate;
assembling the first substrate and the second substrate; and
separating the assembled first and second substrates into unit panels.

24. The method of claim 21, wherein the IPS panel region, the VA panel region, and TN panel region have the same area.

25. The method of claim 21, wherein the IPS panel region, the VA panel region, and TN panel region have different areas.

26. The method of claim 21, wherein at least two of the display mode panel regions have the same area.

27. A method of fabricating a liquid crystal display device, comprising:
providing a first substrate including a first display mode panel region and a second display mode panel region;
forming thin film transistors in the first and second display mode panel regions;
forming a first alignment layer over the first substrate;
rubbing the first alignment layer in the first display mode panel region to provide a first alignment direction thereto; and
rubbing the first alignment layer in the second display mode panel region to provide a second alignment direction thereto,
wherein the first alignment direction is different from the second alignment direction,
wherein the first and second display mode panel regions each includes a plurality of pixels having the thin film transistors and the thin film transistors in the first display mode panel region are driven independently from those in the second display mode panel region,
wherein the first display mode panel region and the second display mode panel region each includes a Twisted Nematic (TN) display mode panel region, a Vertical Alignment (VA) display mode panel region, and a In Plane Switching (IPS) display mode panel region.

28. The method of claim 27, wherein forming thin film transistor includes:
forming gate electrodes in the first and second display mode panel regions on the first substrate;
forming a gate insulating layer over the first substrate;
forming semiconductor layers in the first and second display mode panel regions on the gate insulating layer;
forming source and drain electrodes on the semiconductor layers; and
forming a passivation layer over the first substrate.

29. The method of claim 27, wherein forming the thin film transistor includes:
forming gate electrodes in the first and second display mode panel regions on the first substrate;
forming a gate insulating layer over the first substrate;
depositing continuously semiconductor material and metal on the gate insulating layer to form semiconductor layers and source and drain electrodes in the first and second display mode panel regions using a diffraction mask; and
forming a passivation layer over the first substrate.

30. The method of claim 27, further comprising:
providing a second substrate having a first display mode panel region and a second display mode panel region;
forming black matrix and color filter layers over the second substrate;
forming a second alignment layer over the second substrate;
providing third alignment direction on the second alignment layer in the first display mode panel region;
providing fourth alignment direction on the second alignment layer in the second display mode panel region; and
forming liquid crystal display panels.

31. The method of claim 30, wherein forming liquid crystal display panels includes:
dropping liquid crystal on the surface of at least one of the first substrate and the second substrate;
assembling the first substrate and the second substrate; and
separating the assembled first and second substrates into unit panels.

* * * * *